(12) United States Patent
Kim (10) Patent No.: US 7,388,698 B2
(45) Date of Patent: Jun. 17, 2008

(54) LASER SCANNING UNIT WITH MENISCUS SCAN LENS HAVING ASYMMETRIC, NEGATIVE CURVATURE IN THE SUB-SCANNING DIRECTION AND ABSOLUTE CURVATURE VALUES IN THE MAIN-SCANNING DIRECTION THAT ARE MAXIMAL AT THE CENTER AND DIFFERING MINIMAL VALUES AT EACH SIDE

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 11/171,401

(22) Filed: Jul. 1, 2005

(65) Prior Publication Data

US 2006/0001938 A1 Jan. 5, 2006

(30) Foreign Application Priority Data

Jul. 2, 2004 (KR) ...................... 10-2004-0051517

(51) Int. Cl.
*G02B 26/08* (2006.01)
(52) U.S. Cl. .................................. 359/206
(58) Field of Classification Search ........ 359/205–207, 359/662, 668, 720; 250/559.06; 347/137, 347/258, 259; 358/447
See application file for complete search history.

(56) References Cited

U.S. PATENT DOCUMENTS

| | | | |
|---|---|---|---|
| 5,111,219 A * | 5/1992 | Makino ...................... 347/259 |
| 5,600,476 A * | 2/1997 | Takada et al. ............... 359/206 |
| 5,721,631 A | 2/1998 | Nakamura et al. |
| 5,808,773 A * | 9/1998 | Ono ........................... 359/205 |
| 5,818,505 A * | 10/1998 | Kato ........................... 347/258 |
| 6,133,935 A * | 10/2000 | Fujibayashi et al. ........ 347/258 |
| 6,137,617 A | 10/2000 | Yoshikawa et al. |
| 6,154,303 A | 11/2000 | Rim et al. |
| 6,489,982 B2 * | 12/2002 | Ishibe ........................ 347/134 |
| 2002/0048072 A1 * | 4/2002 | Ishihara ...................... 359/204 |

FOREIGN PATENT DOCUMENTS

| | | |
|---|---|---|
| EP | 0 745 880 A2 | 12/1996 |
| JP | 09-179019 | 7/1997 |
| JP | 09-281422 | 10/1997 |

(Continued)

*Primary Examiner*—Stephone B. Allen
*Assistant Examiner*—Jennifer L Doak
(74) *Attorney, Agent, or Firm*—Roylance, Abrams, Berdo and Goodman, LLP (57) ABSTRACT

A scanning optical lens used for a laser scanning unit for imaging a laser, which is deflected by a beam deflection unit, on a photosensitive body. The scanning optical lens has a curvature of a Meniscus shape at a sub-scanning direction section, wherein the Meniscus shape has the same curvature symbols at an incidence surface and an exit surface at a center of the lens. The incidence surface and the exit surface always have negative (−) curvature symbols. An absolute curvature value of the incidence surface is maximal at the center, and has at least one minimal value at each of both sides in a main-scanning direction and wherein at least one of the minimal values is approximately zero.

15 Claims, 9 Drawing Sheets

FOREIGN PATENT DOCUMENTS

| | | |
|---|---|---|
| JP | 10-148755 | 6/1998 |
| JP | 10-282409 | 10/1998 |
| JP | 2002-090677 | 3/2002 |
| JP | 2003-337295 | 11/2003 |
| JP | 2004-004154 | 1/2004 |

* cited by examiner

LASER SCANNING UNIT WITH MENISCUS SCAN LENS HAVING ASYMMETRIC, NEGATIVE CURVATURE IN THE SUB-SCANNING DIRECTION AND ABSOLUTE CURVATURE VALUES IN THE MAIN-SCANNING DIRECTION THAT ARE MAXIMAL AT THE CENTER AND DIFFERING MINIMAL VALUES AT EACH SIDE

CROSS-REFERENCE TO RELATED APPLICATIONS

This application claims the benefit under 35 U.S.C. §119 (a) of Korean Patent Application No. 10-2004-0051517, filed in the Korean Intellectual Property Office on Jul. 2, 2004, the entire disclosure of which is incorporated herein by reference.

BACKGROUND OF THE INVENTION

1. Field of the Invention

The present invention relates to a scanning optical lens having an asymmetric curvature and a laser scanning unit employing the same. More particularly, the present invention relates to a scanning optical lens having an asymmetric curvature in a sub-scanning direction, and a laser scanning unit for reducing a distance from a deflection unit to a photosensitive drum by employing the scanning optical lens.

2. Description of the Related Art

Figure 1:
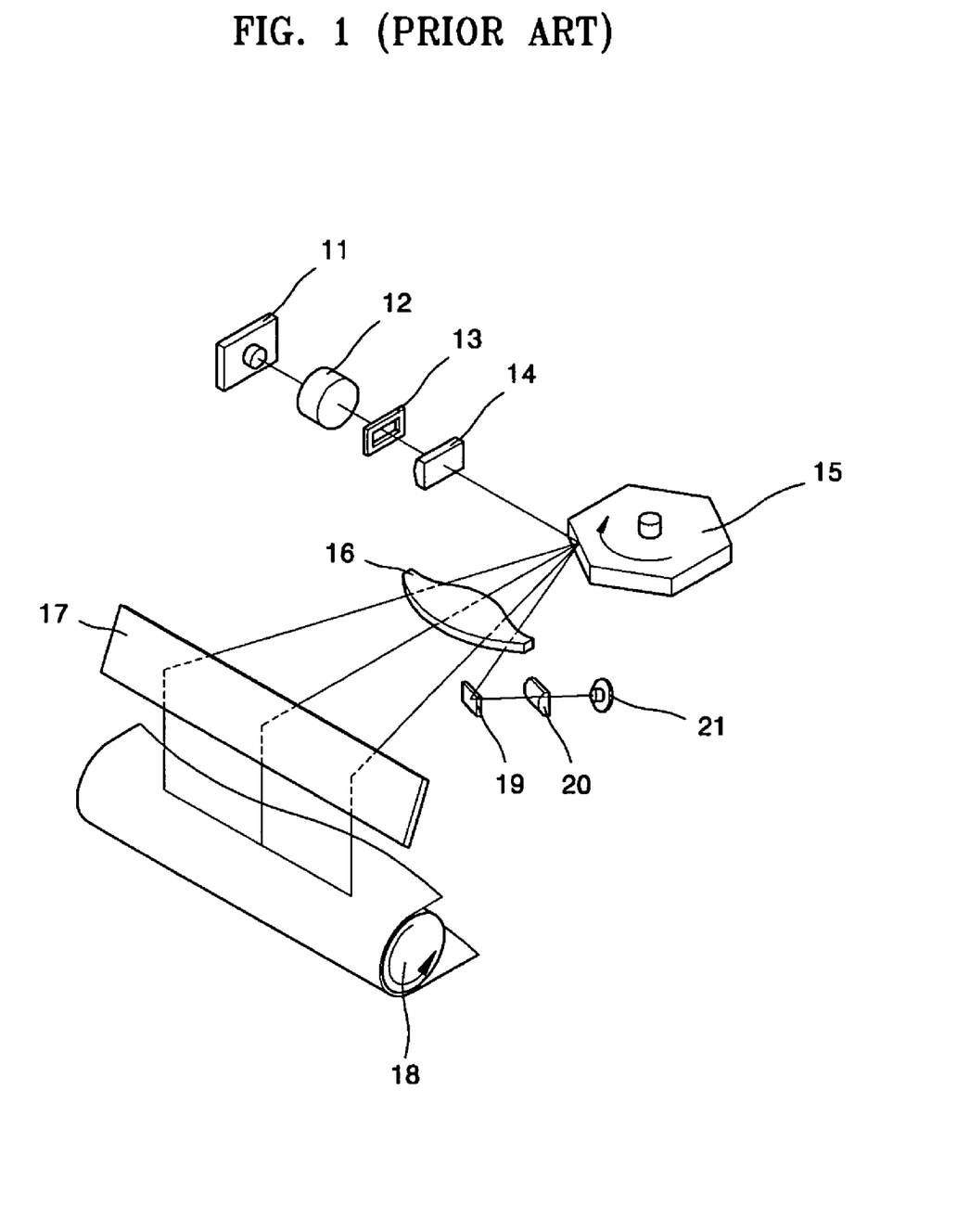
FIG. 1 is a view schematically illustrating a conventional laser scanning unit.

A Laser Scanning Unit (LSU) is an image forming apparatus for scanning and imaging a laser beam on a photosensitive drum to form an image in a printing apparatus such as a laser printer. FIG. 1 is a view schematically illustrating a conventional laser scanning unit. As shown in FIG. 1, the laser scanning unit is comprised of a laser source 11, a collimating lens 12, an aperture stop 13, a cylindrical lens 14, a beam deflection unit 15, a scanning optical lens 16, a photosensitive drum 18 and synchronous signal detecting units 19, 20, and 21. The laser emitting from the laser source 11 is converted into a parallel beam by the collimating lens 12, and the parallel beam is limited in shape by the aperture stop 13 and passes through the cylindrical lens 14. At this time, the parallel beam is converged in a sub-scanning direction by the cylindrical lens 14. After that, the converged laser is deflected in a main-scanning direction (that is, in a horizontal direction) by the beam deflection unit 15 rotating at a high speed while being imaged on the photosensitive drum 18 through the scanning optical lens 16 and deflector 17.

Here, the scanning optical lens 16, which is called an "F-theta lens", functions to focus the laser on a surface of the photosensitive drum 18. In the apparatus shown in FIG. 1, the scanning optical lens 16 should be able to have a constant refractive index with respect to an optical axis and correct aberration. Further, the scanning optical lens 16 should also function to correct a deviation of the laser deflected at the beam deflection unit 15.

Figure 2A:
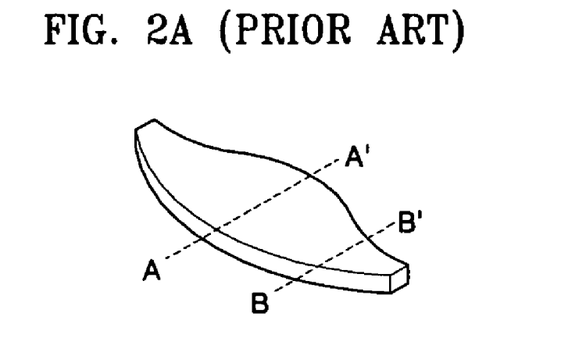
FIGS. 2A through 2D are detailed views illustrating shapes of conventional scanning optical lenses.
Figure 2B:
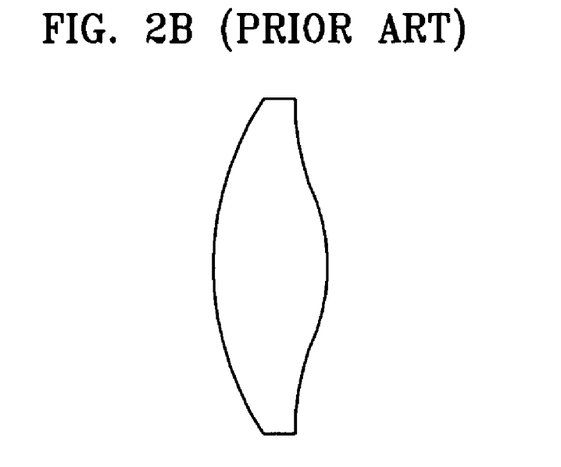
Figure 2C:
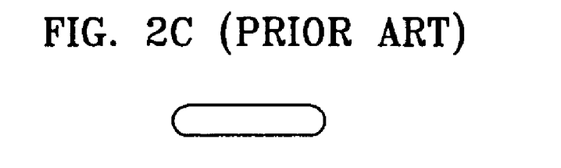
Figure 2D:
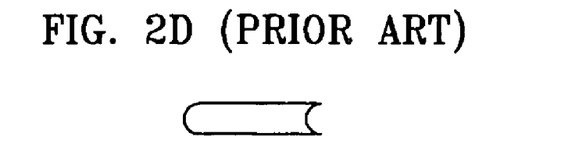

In order to perform this function, the scanning optical lens 16 has a specific configuration as shown in FIG. 2A, unlike a general lens. That is, as shown in FIG. 2B, a main-scanning direction section is convexed at an incidence surface and at an exit surface. The exit surface is a circular arc shape, whereas the incidence surface is a non-circular arc shape. As shown in FIG. 2C, in the sub-scanning direction section, an A-A' section of a central portion of the lens 16 of FIG. 2A, has both convexed shapes, in which both the incidence surface and the exit surface are convexed. In contrast, as shown in FIG. 2D, a B-B' section of an edge portion of the lens 16 of FIG. 2A, is concave-shaped at the incidence surface, and is convex-shaped at the exit surface.

Figure 3A:
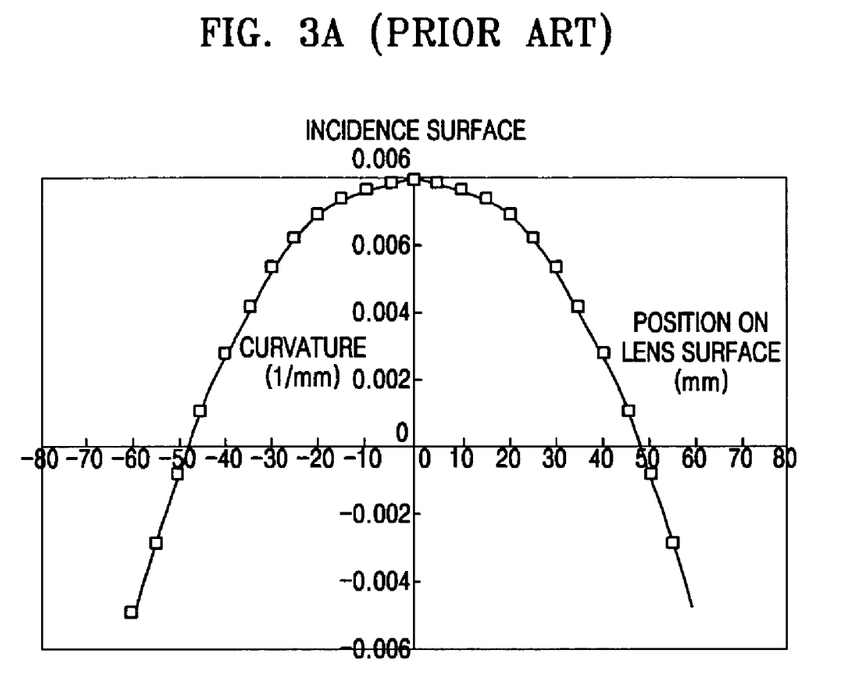
FIGS. 3A and 3B are graphs illustrating curvatures of sub-scanning directions at each of an incidence surface and an exit surface in a conventional scanning optical lens.
Figure 3B:
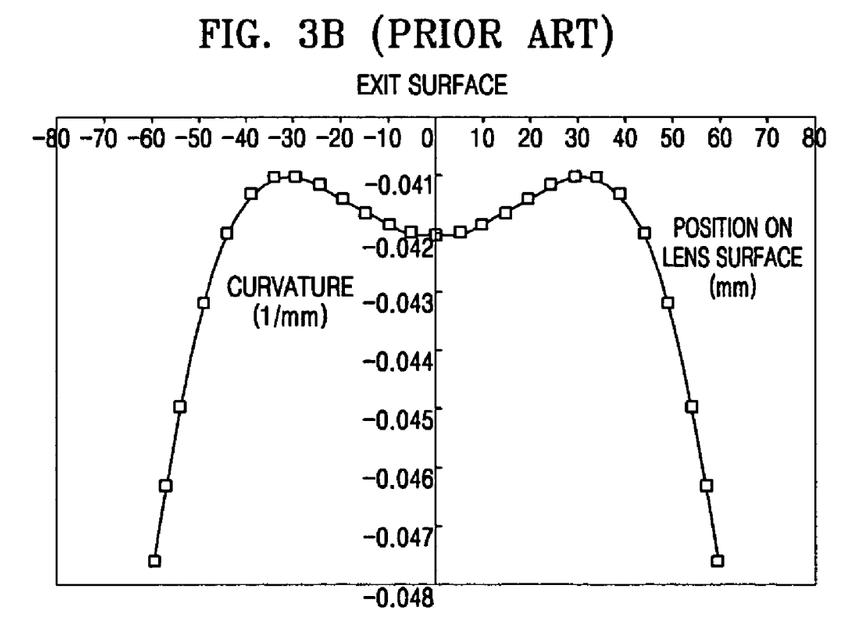

As shown in the graphs of FIGS. 3A and 3B, a curvature of the incidence surface and the exit surface in the sub-scanning direction section is designed to continuously vary in the main-scanning direction. As appreciated from the graphs, in the incidence surface, the curvature is gradually decreased with reference to a center of the lens while being varied from positive (+) to negative (−) at the edge portion. That is, the center portion is convexed, but the edge portion is concaved as the curvature is gradually decreased. Meanwhile, in the exit surface, the curvature is gradually increased and again begins to reduce with reference to the center of the lens. However, since the curvature is always negative (−) at the exit surface, the exit surface is always convex-shaped. Accordingly, the scanning optical lens 16 is a kind of Anamophic lens having a different magnification in a vertical direction and in a horizontal direction.

Although the above conventional scanning optical lens 16 can beneficially correct optical aberration by using one lens, the lens 16 has a disadvantage in that an effective scanning angle cannot be increased to a great extent. Accordingly, since it is then impossible to shorten a distance from the beam deflection unit 15 to the photosensitive drum 18, there is a limit to the miniaturization of the conventional laser scanning unit. Further, since the scanning optical lens 16 has a relatively high image magnification in the sub-scanning direction, a stable optical performance is limited to that extent, and an improvement in the quality of a printed image is limited. This results since there is a performance non-stabilization factor and the laser beam is not uniform within an image forming area as the imaging magnification is enlarged.

Further, there is a disadvantage in that a multi-beam laser scanning unit, developed for providing faster printing, has the high imaging magnification in a sub-scanning direction. The multi-beam laser scanning unit scans a plurality of lasers in the sub-scanning direction at one time, and emits a plurality of lasers in the sub-scanning direction at the same time. In the case wherein the multi-beam laser scanning unit prints at an image quality of 600 dpi, a dot pitch in the sub-scanning direction should be about 42 μm on the photosensitive drum 18. However, the multi-beam laser scanning unit has a drawback in that in the case wherein the imaging magnification is more than five times as much as in the sub-scanning direction, an interval between the laser sources should be less than 10 μm in the sub-scanning direction, which is unrealizable.

Still further, the conventional scanning optical lens 16 is designed to have the curvature varying from positive (+) to negative (−), or from negative (−) to positive (+), at any point in the sub-scanning direction. This means that the lens 16 varies from a convex state (or concave state) to a plane state at any point and then, to a concave state (or convex state). However, in the case wherein a symbol of the curvature is changed, it is difficult to form a metal pattern for injecting the scanning optical lens. Accordingly, there is a drawback in that it is difficult to manufacture the scanning optical lens 16, and the resulting scanning optical lens is manufactured at a higher cost.

Accordingly, a need exists for a system and method for providing a laser scanning unit to enlarge the effective scanning angle and shorten the distance from the deflection unit to the photosensitive body, and reduce manufacturing costs while doing so.

SUMMARY OF THE INVENTION

The present invention substantially solves the above and other problems, and provides a scanning optical lens having a larger effective scanning angle and performing stable optical performance, even though an image magnification is smaller in a sub-scanning direction.

Also, the present invention provides a scanning optical lens capable of being more easily manufactured.

Further, the present invention provides a laser scanning unit, specifically, a multi-beam laser scanning unit capable of being miniaturized to a greater extent, and providing a high image quality of printing by employing the scanning optical lens.

According to an aspect of the present invention, a scanning optical lens is provided for a laser scanning unit, wherein a sub-scanning direction section of the scanning optical lens has a meniscus shape such that its incidence surface and exit surface have the same curvature sign at a center portion of the lens, and wherein its incidence surface and exit surface always have a negative (−) curvature sign, and wherein an absolute curvature value of the incidence surface is maximal at the center and has at least one minimal value at each of both sides in a main-scanning direction and at least one of the minimal values is approximately zero. In an exemplary embodiment, the absolute curvature value of the sub-scanning direction section of the incidence surface is more than zero and less than 0.001 to provide a value that is approximately zero.

Further, an absolute curvature value of the exit surface at the sub-scanning direction section of the lens is maximal at the center, and has at least one minimal value at each of both sides in a main-scanning direction and at least one of the minimal values is approximately zero, and wherein the minimal values at the both sides are asymmetric with each other.

Still further, a main-scanning direction of the scanning optical lens has a meniscus shape such that its incidence surface and exit surface have the same curvature sign at the center of the lens, and wherein the incidence surface and the exit surface are almost symmetrically varied in shape in the main-scanning direction with reference to the center.

In an exemplary embodiment, the sub-scanning direction section is varied in curvature at the incidence surface and the exit surface in the main-scanning direction within a range of about −0.1 to about −0.0001.

In an exemplary embodiment of the scanning optical lens, an imaging magnification is provided within a range of about 1.0 to about 2.5 in the sub-scanning direction, and an effective scanning angle is within a range of about 85° to about 120°.

In another aspect of the present invention, a laser scanning unit is provided having a laser source for emitting a laser, a beam deflection unit for deflecting the laser beam in a main-scanning direction, a scanning optical lens for uniformly imaging the laser beam, and a photosensitive body for forming a latent image. A sub-scanning direction section of the scanning optical lens has a meniscus shape such that its incidence surface and exit surface have the same curvature sign at a center portion of the lens, wherein the incidence surface and the exit surface always have a negative (−) curvature sign, and wherein an absolute curvature value of the incidence surface is maximal at the center and has at least one minimal value at each of both sides in a main-scanning direction. At least one of the minimal values is approximately zero. In an exemplary embodiment, the absolute curvature value of the sub-scanning direction of the incidence surface is more than zero and less than 0.001 to provide a value that is approximately zero.

Further, a distance from the beam deflection unit to the photosensitive body is within a range of about 110 mm to about 165 mm.

Still further, the beam deflection unit comprises a polygonal-shaped deflection mirror for deflecting the laser in the main-scanning direction toward a photosensitive drum, and a motor for rotating the deflection mirror at a constant velocity, wherein the deflection mirror comprises multiple (for example, four) mirror surfaces.

Additionally, the laser source can emit a plurality of lasers in the sub-scanning direction.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF THE EXEMPLARY EMBODIMENTS

Hereinafter, the present invention will be described in detail by explaining a number of exemplary embodiments of the present invention with reference to the attached drawings.

Figure 4:
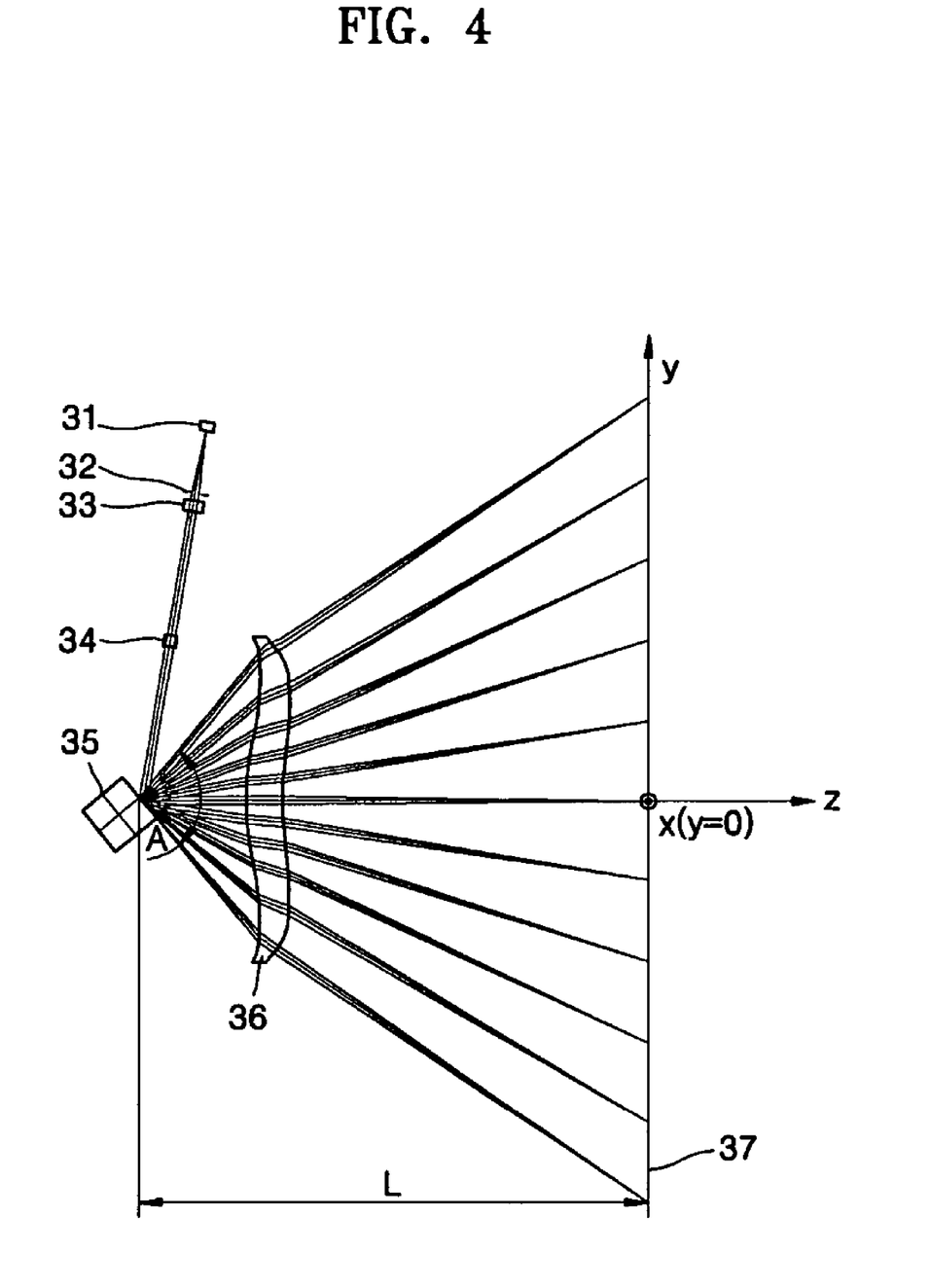
FIG. 4 is a view schematically illustrating a laser scanning unit and a scanning optical lens according to an embodiment of the present invention.

FIG. 4 is a view schematically illustrating a laser scanning unit and a scanning optical lens according to an embodiment of the present invention.

As shown in FIG. 4 illustrating a section of an imaging structure of a main-scanning direction of a laser scanning unit, the laser scanning unit comprises a laser source 31 for emitting one or a plurality of lasers, an aperture stop 32 for limiting a bundle of rays emitted from the laser source 31, a collimating lens 33 for collimating the laser beam to form a parallel beam, a cylindrical lens 34 for converging the parallel beam in a sub-scanning direction, a beam deflection unit 35 for deflecting the laser beam in the main-scanning direction while rotating at a constant velocity, a scanning optical lens 36 for uniformly imaging the laser beam on a photosensitive body 37, and the photosensitive body 37 exposed to the laser to form a latent image. In an exemplary embodiment shown in FIG. 4, the aperture stop 32 is disposed between the laser source 31 and the collimating lens 33, but in yet other embodiments of the present invention, the stop 32 can be disposed between the collimating lens 33 and the cylindrical lens 34. Further, in yet other embodiments of the present invention, the laser source 31 can be comprised of a multi laser-source for emitting a plurality of lasers in the sub-scanning direction.

Additionally, the beam deflection unit 35 includes a polygonal-shaped deflection mirror (hereinafter referred to as the "deflection mirror 35") for deflecting the laser beam in the main-scanning direction toward the photosensitive body 37, and a motor (not shown) for rotating the deflection mirror 35 at the constant velocity. As shown in FIG. 4, the deflection mirror 35 may comprise four deflection mirror surfaces to allow a large scanning angle and to downsize the deflection mirror 35. Accordingly, the deflection mirror 35 may have a substantially square shape as viewed from a top view.

In FIG. 4, "A" represents an effective scanning angle of the scanning optical lens 36 for uniformly imaging the laser beam on the photosensitive body 37, and "L" represents a distance from a deflection mirror 35 surface to an imaging surface of the photosensitive body 37. As described above, an object of the present invention is to provide the scanning optical lens 36 to be easily manufactured having a large effective scanning angle (A) and a short distance (L) from the deflection mirror 35 surface up to the imaging surface. Further, the scanning optical lens 36 is used to provide a miniaturized laser scanning unit as compared with a conventional laser scanning unit.

For this, the exemplary scanning optical lens 36 of FIG. 4 is comprised of a type of Meniscus lens having a section shape in the main-scanning direction (that is, the Y-axis direction of FIG. 4) in which an incidence surface and an exit surface have the same curvature sign at a center (that is, an origin of the Y-axis). The incidence surface and the exit surface are almost symmetrically varied in shape in the main-scanning direction with reference to the center (Y=0). In greater detail, as shown in FIG. 4, an incidence section in the main-scanning direction of the scanning optical lens 36 is convex-shaped (that is, curvature sign (+)) at the center. Additionally, in the positive Y-direction and the negative Y-direction from the center, the incidence section is bent in the laser traveling direction (that is, the positive Z-direction), and is again bent in the opposite direction (that is, the negative Z-direction) at an end portion of the lens 36 to thereby have a concave shape. That is, the scanning optical lens 36 has an incidence surface which is convex-shaped at the center of the lens and is concave-shaped at both sides of the center.

Figure 6A:
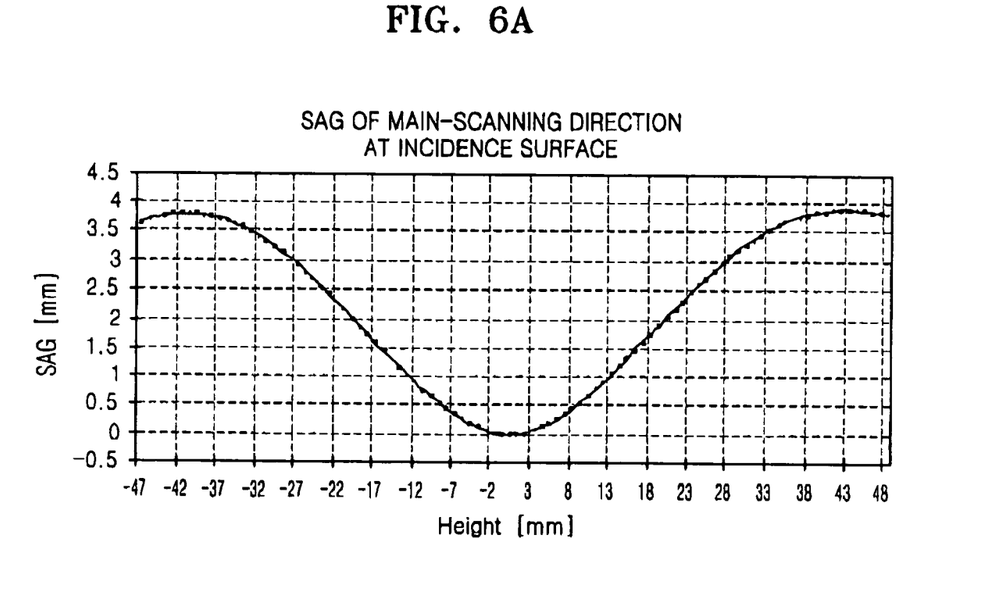
FIGS. 6A and 6B are graphs illustrating examples of SAGs of main-scanning directions at each of an incidence surface and an exit surface of a scanning optical lens according to an embodiment of the present invention.

FIG. 6A is a graph illustrating an example of SAG (that is, a depth of a lens surface ranging from a reference point to the laser traveling direction) of the main-scanning direction at the incidence surface of the scanning optical lens 36 according to an embodiment of the present invention. That is, FIG. 6A illustrates a positional variation of the lens surface on the Z-axis depending on a variation of the Y-axis, when it is assumed that a position of the lens surface on the Z-axis is at zero at the center of the incidence section. As shown in FIG. 6A, in the exemplary scanning optical lens 36 of FIG. 4, the SAG of the incidence surface is continuously and greatly increased in the positive Y-direction and the negative Y-direction, and the SAG is reduced slightly at the end portions of the lens 36. In the exemplary embodiment, the SAGs in the positive Y-direction and the negative Y-direction are substantially symmetrical with each other, with little variation.

Further, an exit section in the main-scanning direction of the scanning optical lens 36 is concave-shaped (that is, curvature symbol (+)) at the center (Y=0). In the exemplary embodiment, when the curvature symbol is positive (+), the incidence surface is convex-shaped, and when the curvature symbol is negative (−), the incidence surface is concave-shaped. However, when the curvature symbol is positive (+), the exit surface is concave-shaped, and when the curvature symbol is negative (−), the exit surface is convex-shaped. Additionally, in the positive Y-direction and the negative Y-direction from the center, the exit section is bent in the laser traveling direction (that is, the positive Z-direction) and is again bent in the opposite direction (that is, the negative Z-direction) to have a concave shape. That is, the scanning optical lens 36 has the exit surface which is concave-shaped at the center and is convex-shaped at both end sides of the center.

Figure 6B:
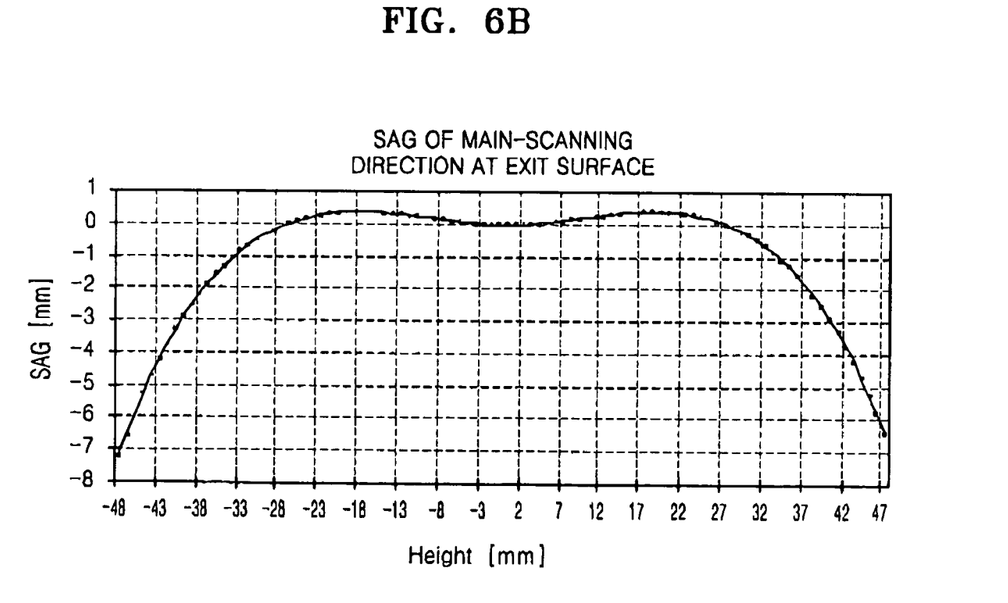

FIG. 6B is a graph illustrating an example of SAG of the main-scanning direction at the exit surface of the scanning optical lens 36 according to an embodiment of the present invention. That is, FIG. 6B illustrates a positional variation of the lens surface on the Z-axis depending on a variation of the Y-axis, when it is assumed that a position of the lens surface on the Z-axis is at zero at the center of the exit section. As shown in FIG. 6B, in the exemplary scanning optical lens 36 of FIG. 4, the SAG of the exit surface is increased slightly to the maximum in the positive Y-direction and the negative Y-direction. After that, the SAG rapidly begins to reduce and has a negative value from about the middle point between the center of the lens 36 and the end. Additionally, the SAG is minimized at both sides of the lens 36. In the exemplary embodiment, the SAGs in the positive Y-direction and the negative Y-direction are substantially symmetrical with each other, with little variation.

Figure 5:
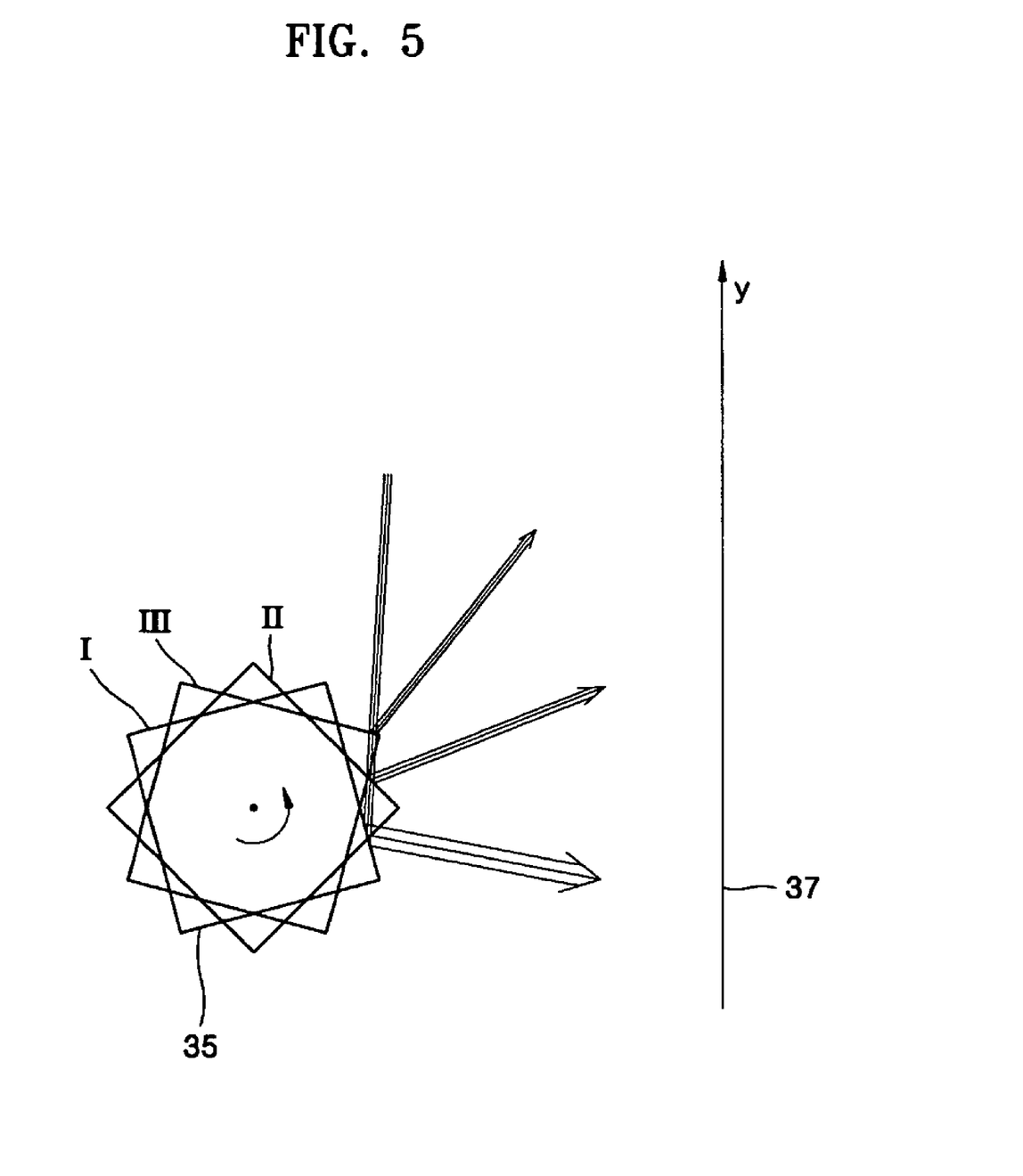
FIG. 5 is a view illustrating why a reflectance position and a size of a beam diameter are varied as a deflection mirror is rotated.

It can be appreciated with reference to FIG. 5 why the incidence surfaces of the scanning optical lens 36 are asymmetric with each other. Generally, the polygonal-shaped deflection mirror 35 should preferably rotate at a regular velocity while a laser reflectance angle should preferably be continuously varied, so as to deflect the laser in the main-scanning direction in the laser scanning unit. As shown in FIG. 5, the laser should be slantingly incident on the deflection mirror 35 so as to deflect the laser in the right direction (that is, the negative Y-direction) of the photosensitive body 37, and the laser should be almost vertically incident on the deflection mirror 35 so as to deflect the laser in the left direction (that is, the positive Y-direction) of the photosensitive body 37.

However, if the polygonal-shaped deflection mirror 35 rotates through positions I, II and III while controlling the incidence and reflectance angle of the laser, a position at which the laser is incident on and a position from which the laser is reflected from the deflection mirror 35 surface, is varied as shown in FIG. 5. Further, since the angle at which the laser is incident on the deflection mirror 35 surface is varied, a diameter (that is, a beam diameter) of the reflected laser is also varied slightly. As a result, the diameter and incidence angle of the laser incident on the scanning optical lens 36 are not symmetrical with reference to the center of the scanning optical lens 36. Accordingly, in order to more uniformly scan the laser on the photosensitive body 37, it is required to asymmetrically design the scanning optical lens 36.

Figure 7A:
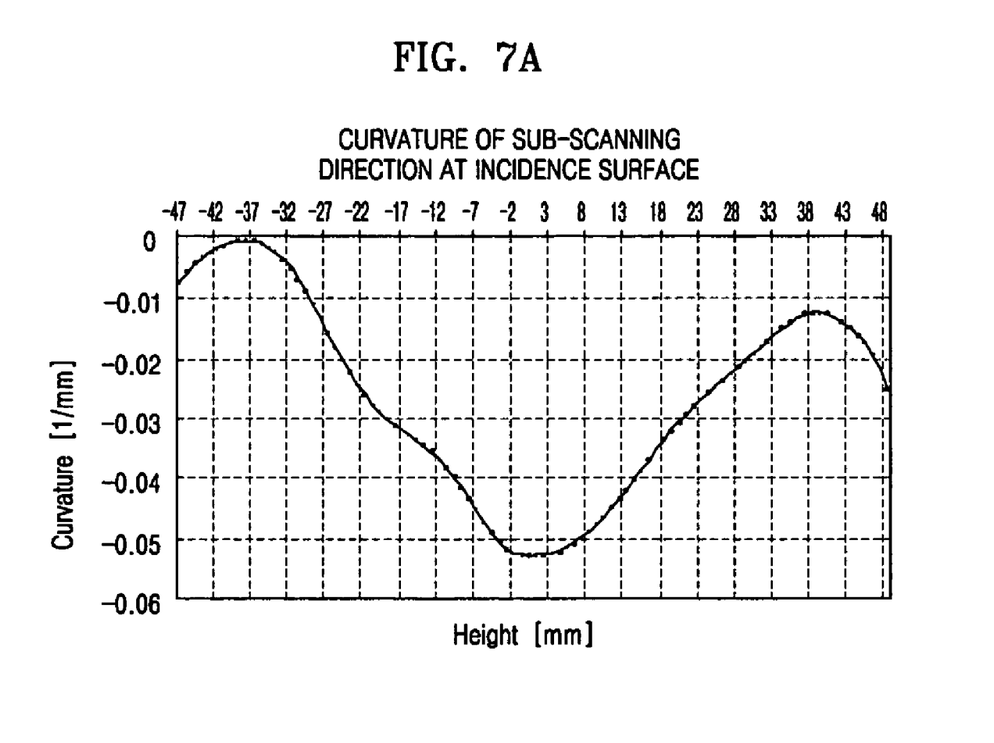
FIGS. 7A through 7D are graphs illustrating examples of a curvature and a curvature radius of sub-scanning directions at each of an incidence surface and an exit surface of a scanning optical lens according to an embodiment of the present invention.
Figure 7B:
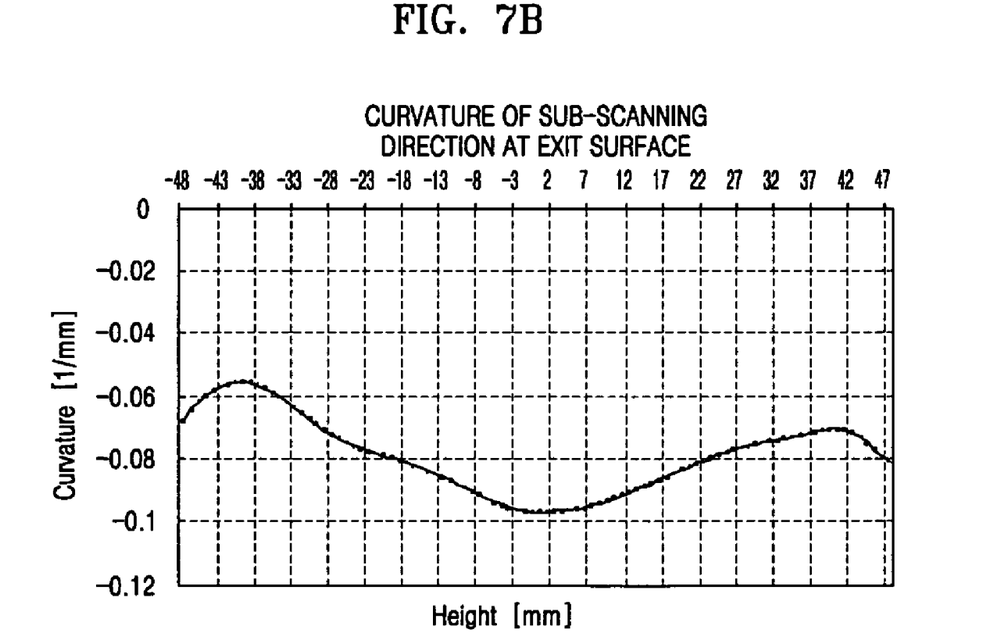

Referring to FIGS. 7A through 7D, the section shape in the sub-scanning direction (the X-axis direction of FIG. 4, that is, a direction from the rear to the front) of the scanning optical lens 36 according to an embodiment of the present invention will now be described in greater detail. FIG. 7A illustrates the sub-scanning direction curvature of the incidence surface of the scanning optical lens 36, and FIG. 7B illustrates the sub-scanning direction curvature of the exit surface of the scanning optical lens 36. In FIGS. 7A and 7B, the curvature signs of the incidence surface and the exit surface are the same at the center of the scanning optical lens 36. Additionally, the incidence surface and the exit surface are always maintained to have negative curvature signs (−). Accordingly, the scanning optical lens 36 has a sub-scanning direction section which is always concave-shaped at the incidence surface and is always convex-shaped at the exit surface.

In greater detail, as shown in FIG. 7A, an absolute value of a sub-scanning direction curvature at the incidence surface is maximized at the center (Y=0). Additionally, the absolute value of the sub-scanning direction curvature is rapidly reduced in the positive Y-direction and the negative Y-direction, and is increased slightly at the end portions of the lens 36. Accordingly, the exemplary scanning optical lens 36, respectively, has at least one minimal value at both end portions of the lens 36. In the exemplary embodiment, the inventive scanning optical lens 36 is asymmetrically designed such that the minimal value of the negative Y-direction is approximately zero.

Figure 7C:
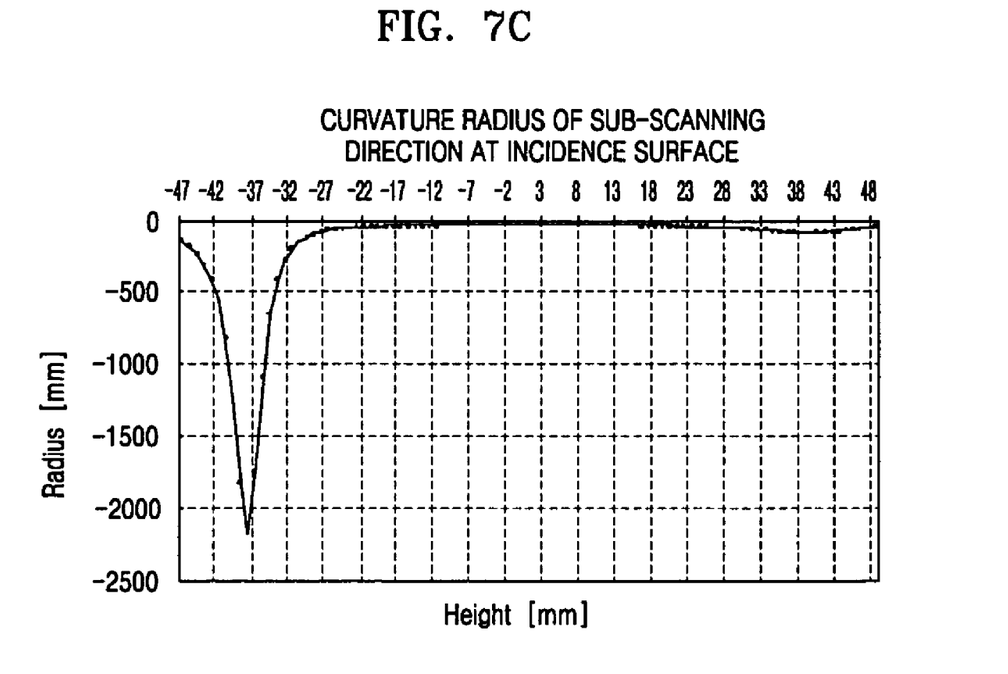
Figure 7D:
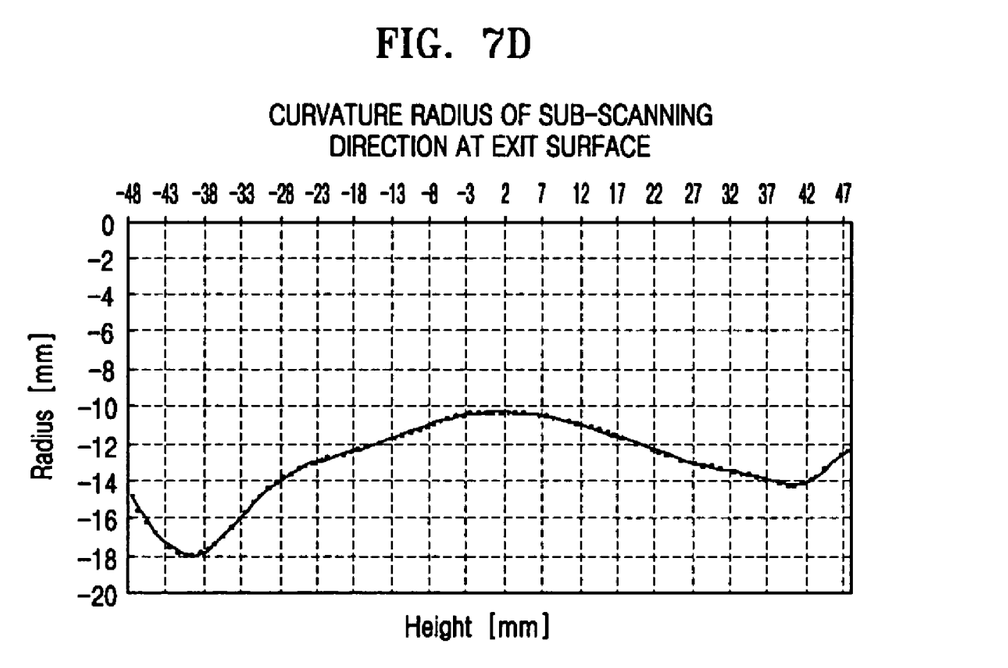

In the example of FIG. 7A, the minimal value of the negative Y-direction is approximately 0.00046 (that is, the sub-scanning direction curvature is −0.00046 at the incidence surface). FIG. 7C illustrates the curvature radius of the sub-scanning direction at the incidence surface. In FIG. 7C, the curvature radius reaches approximately −2000 mm at a point at which the curvature is approximately zero, such that the incidence surface of the lens is almost a plane. Here, a negative (−) sign represents that the incidence surface of the lens is concave-shaped. In the exemplary embodiment of the present invention shown in FIG. 4, it is preferable that the sub-scanning direction curvature of the incidence surface be approximately zero, that is, less than zero and more than about −0.001, and the absolute value of the curvature is more than zero and less than about 0.001.

As shown in FIG. 7B, the absolute value of the sub-scanning direction curvature is maximized at the center (Y=0) at the exit surface of the scanning optical lens 36 according to an embodiment of the present invention. Additionally, the absolute value of the sub-scanning direction curvature is slowly reduced in the positive Y-direction and the negative Y-direction, and is increased slightly at the end portions of the lens 36. Accordingly, in the same way as the incidence surface, the exemplary scanning optical lens 36 has at least one minimal value at its both end portions, even at the exit surface. In the exemplary embodiment, the scanning optical lens 36 is asymmetrically designed to have the different minimal values at the both end portions.

With the above configurations, the exemplary scanning optical lens 36 can regularize an interval and a diameter of the laser which is scanned on the photosensitive body, and can also enlarge the effective scanning angle to shorten the distance from the deflection unit to the photosensitive body. The exemplary scanning optical lens 36 has a low imaging magnification to provide a stable optical performance, and can be easily applied to a multi-beam laser scanning unit. Further, since the lens surface is not varied from the concave shape to the convex shape, or from the convex shape to the concave shape, the exemplary scanning optical lens can be easily manufactured. In the case wherein the scanning optical lens 36 has a curvature variation of the sub-scanning direction section in the positive Y-direction and the negative Y-direction at the incidence surface and the exit surface within a range of about −0.1 to about −0.0001, the effective scanning angle (A), the distance (L) from the deflection unit to the photosensitive body, and the imaging magnification (M) of the sub-scanning direction of the scanning optical lens can be obtained from the following Equation (1).

$$120° \geq A \geq 85°$$

$$165 \text{ mm} \geq L \geq 110 \text{ mm}$$

$$2.5 \text{ times} \geq M \geq 1.0 \text{ time} \qquad \text{Equation (1)}$$

An example of a design of the scanning optical lens 36 in accordance with an embodiment of the present invention can be represented in the following exemplary Equation (2) and Table 1. First, an aspheric formula of the general scanning optical lens is expressed in the following Equation (2), $$Z = \frac{C_y y^2}{1 + \sqrt{1 - C_y^2 (k_y + 1) y^2}} + \sum_{m=3}^{10} A_m Y^m + \frac{C_x \left(1 + \sum_{n=3}^{10} B_n Y^n\right) x^2}{1 + \sqrt{1 - C_x^2 \left(1 + \sum_{n=3}^{10} B_n Y^n\right)^2 x^2}}$$

$$(Y = \sqrt{y^2},\ C_y = 1/R_y,\ C_x = 1/R_x)$$

$$\text{Equation (2)}$$

wherein Z denotes a depth of the lens surface with reference to the laser traveling direction, x denotes a coordinate of the sub-scanning direction, y denotes a coordinate of the main-scanning direction, $R_x$ denotes a curvature radius of the sub-scanning direction, $R_y$ denotes a curvature radius of the main-scanning direction, $k_y$ denotes an aspheric coefficient, and $A_m$ and $B_n$ denote coefficient values that can be selected to respectively design the lens.

In order to obtain an exemplary scanning optical lens from Equation (2) with the effective scanning angle (A) being 104.2° and the distance (L) being 142.9 mm, the coefficients are determined as in the following Table 1.

TABLE 1

| | Incidence surface | | Exit surface | | | Incidence surface | | Exit surface | |
|---|---|---|---|---|---|---|---|---|---|
| | y > 0 | y < 0 | y > 0 | y < 0 | | y > 0 | Y < 0 | y > 0 | Y < 0 |
| Ry | 6.56E+01 | | 1.70E+02 | | Cx | −5.26E−02 | | −9.67E−02 | |
| Ky | 0.00E+00 | 0.00E+00 | 0.00E+00 | 0.00E+00 | B3 | −3.81E−04 | −1.17E−03 | −1.03E−04 | −3.74E−04 |
| A3 | 2.80E−05 | 1.18E−05 | 5.74E−05 | 4.10E−05 | B4 | 5.83E−05 | 1.61E−04 | 4.01E−06 | 6.13E−05 |
| A4 | −2.16E−05 | −2.03E−05 | −2.14E−05 | −2.01E−05 | B5 | −5.71E−06 | −8.75E−06 | 7.50E−07 | −5.08E−06 |
| A5 | 1.20E−06 | 1.15E−06 | 1.32E−06 | 1.26E−06 | B6 | 3.57E−07 | 1.96E−07 | −9.23E−08 | 2.60E−07 |
| A6 | −3.72E−08 | −3.67E−08 | −4.96E−08 | −4.78E−08 | B7 | −1.34E−08 | 8.47E−11 | 4.57E−09 | −8.40E−09 |
| A7 | 6.39E−10 | 6.90E−10 | 1.21E−09 | 1.17E−09 | B8 | 2.92E−10 | −8.58E−11 | −1.17E−10 | 1.66E−10 |
| A8 | −5.51E−12 | −7.48E−12 | −1.91E−11 | −1.84E−11 | B9 | −3.37E−12 | 1.48E−12 | 1.54E−12 | −1.80E−12 |
| A9 | 1.64E−14 | 4.37E−14 | 1.78E−13 | 1.69E−13 | B10 | 1.60E−14 | −8.11E−15 | −8.14E−15 | 8.20E−15 |
| A10 | 1.63E−17 | −1.17E−16 | −7.25E−16 | −6.80E−16 | | | | | |

The above-designed scanning optical lens 36 has the SAGs of the incidence surface and the exit surface in the main-scanning direction, and the curvatures of the incidence surface and the exit surface in the sub-scanning direction, as shown in FIGS. 6A and 6B, and in FIGS. 7A through 7D, respectively.

Figure 8A:
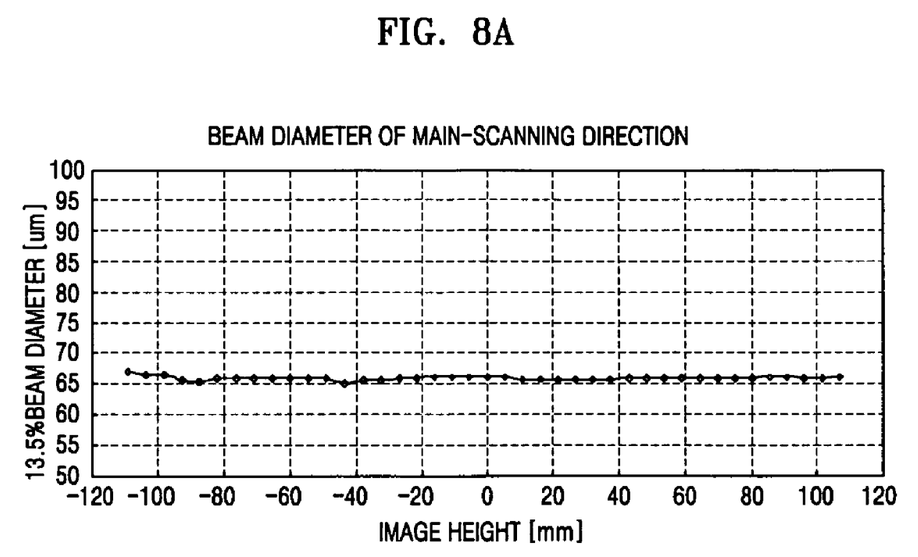
FIGS. 8A and 8B are graphs illustrating a beam diameter of each of a main-scanning direction and a sub-scanning direction in a laser scanning unit according to an embodiment of the present invention.
Figure 8B:
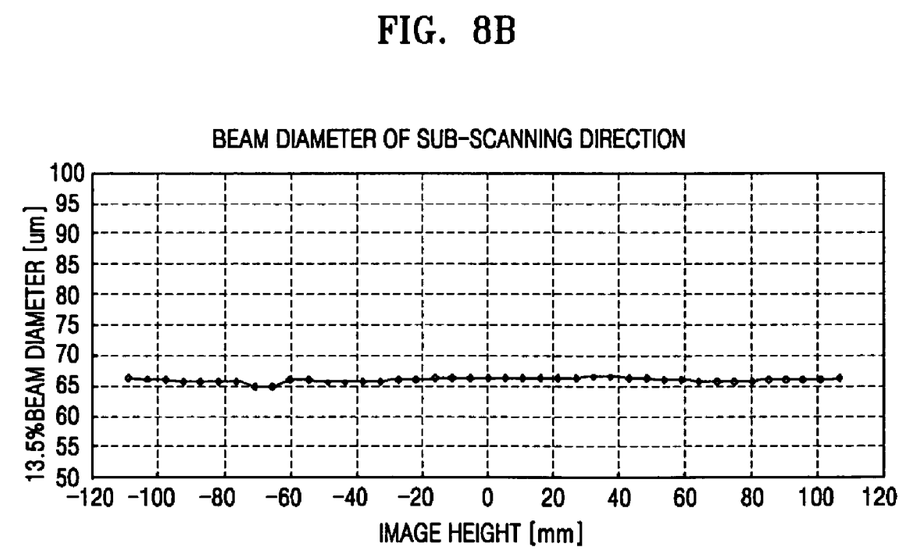

FIGS. 8A and 8B are graphs illustrating a beam diameter of each of the main-scanning direction and the sub-scanning direction in the exemplary laser scanning unit employing the laser optical lens in accordance with an embodiment of the present invention.

As shown in FIGS. 8A and 8B, the graphs reflecting the performance of the exemplary laser scanning unit employing the scanning optical lens in accordance with an embodiment of the present invention can confirm that a deviation of the beam diameter is much smaller within a scanning duration. In the graphs, a 13.5% beam diameter denotes a laser diameter in which a laser intensity is 13.5% of a maximum intensity.

As described above, the exemplary scanning optical lens and the laser scanning unit employing the lens can be employed to regularize the interval and the diameter of the laser scanned to the photosensitive body, and can also enlarge the effective scanning angle to shorten the distance from the deflection unit to the photosensitive body.

Further, the exemplary scanning optical lens has an imaging magnification at a low magnification to provide a stable optical performance, and can be easily applied to a multi-beam laser scanning unit. Accordingly, a laser scanning unit can be provided, and specifically, a multi-beam laser scanning unit can be provided, which can be miniaturized and embody a high picture quality of printing.

Still further, since the lens surface is not varied from the concave shape to the convex shape, or from the convex shape to the concave shape, it is relatively easy to process a metal pattern for injecting the scanning optical lens. Accordingly, the scanning optical lens can be easily manufactured, and can be produced at a reduced cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scanning optical lens for a laser scanning unit, which communicates a laser that is deflected by a beam deflection unit on a photosensitive body, comprising:
    a sub-scanning direction section of the scanning optical lens configured to have a meniscus shape such that an incidence surface and an exit surface have the same curvature sign at a center portion of the lens;
    both the incidence surface and the exit surface configured to always maintain a negative (−) curvature sign, and which have an asymmetric curvature at portions extending from the center portion; and
    the incidence surface further configured to have an absolute curvature value of the incidence surface that is maximal at the center, and has at least one minimal value at each of both sides in a main-scanning direction, wherein the minimal values at each of both sides differ from each other, and wherein at least one of the minimal values is more than zero and less than about 0.001.

2. The lens of claim 1, wherein an absolute curvature value of the exit surface at the sub-scanning direction section of the lens is maximal at the center and has at least one minimal value at each of both sides in a main-scanning direction, and wherein the minimal values at the both sides are asymmetric with each other.

3. The lens of claim 1, wherein a main-scanning direction section of the scanning optical lens is configured to have a meniscus shape such that an incidence surface and an exit surface have the same curvature sign at the center portion of the lens, and the incidence surface and the exit surface are almost symmetrically varied in shape in the main-scanning direction with reference to the center.

4. The lens of claim 3, wherein the sub-scanning direction section is varied in curvature at the incidence surface and the exit surface in the main-scanning direction within a range of about −0.1 to about −0.0001.

5. The lens of claim 1, wherein an imaging magnification is provided to be within a range of about 1.0 magnification to about 2.5 magnification in the sub-scanning direction.

6. The lens of claim 1, wherein an effective scanning angle is within a range of about 85° to about 120°.

7. A laser scanning unit having a laser source for emitting a laser, a beam deflection unit for deflecting the laser in a main-scanning direction, a scanning optical lens for imaging the laser, and a photosensitive body for forming a latent image by using the laser, the scanning optical lens comprising:
    a sub-scanning direction section of the scanning optical lens configured to have a meniscus shape such that an incidence surface and an exit surface have the same curvature sign at a center portion of the lens;
    both the incidence surface and the exit surface configured to always maintain a negative (−) curvature sign, and which have an asymmetric curvature at portions extending from the center portion; and the incidence surface further configured to have an absolute curvature value of the incidence surface that is maximal at the center, and has at least one minimal value at each of both sides in a main-scanning direction, wherein the minimal values at each of both sides differ from each other, and wherein at least one of the minimal values is more than zero and less than about 0.001.

8. The unit of claim 7, wherein an absolute curvature value of the exit surface at the sub-scanning direction section of the lens is maximal at the center and has at least one minimal value at each of both sides in a main-scanning direction, and wherein the minimal values at the both sides are asymmetric with each other.

9. The unit of claim 7, wherein a main-scanning direction section of the scanning optical lens is configured to have a meniscus shape such that an incidence surface and an exit surface have the same curvature sign at the center portion of the lens, and the incidence surface and the exit surface are almost symmetrically varied in shape in the main-scanning direction with reference to the center.

10. The unit of claim 9, wherein the sub-scanning direction section is varied in curvature at the incidence surface and the exit surface of the scanning optical lens in the main-scanning direction within a range of about −0.1 to about −0.0001.

11. The unit of claim 7, wherein the scanning optical lens has an effective scanning angle within a range of about 85° to about 120°.

12. The unit of claim 7, wherein the scanning optical lens has an imaging magnification within a range of about 1.0 magnification to about 2.5 magnification in the sub-scanning direction.

13. The unit of claim 7, wherein a distance from the beam deflection unit to the photosensitive body is within a range of about 110 mm to about 165 mm.

14. The unit of claim 7, wherein the beam deflection unit comprises:
 a polygonal-shaped deflection mirror for deflecting the laser in the main-scanning direction toward a photosensitive drum; and
 a motor for rotating the deflection mirror at a constant velocity, wherein the deflection mirror comprises at least four mirror surfaces.

15. The unit of claim 7, wherein the laser source is configured to emit a plurality of lasers in the sub-scanning direction.

* * * * *